United States Patent [19]

Hwang et al.

[11] 3,754,228

[45] Aug. 21, 1973

[54] COMPUTER OUTPUT DISPLAY SYSTEM

[75] Inventors: Richard A. Hwang, San Carlos; Rolf D. Kahle, Saratoga; Arthur H. Roshon, San Jose; Paul N. Seitz, Milpitas, all of Calif.

[73] Assignee: Quantor Corporation, Cupertino, Calif.

[22] Filed: Aug. 27, 1970

[21] Appl. No.: 67,446

[52] U.S. Cl. ........... 340/324 AD, 95/4.5 R, 315/25, 315/27 R

[51] Int. Cl. ............................................. G06f 3/14

[58] Field of Search ................... 315/19, 26, 23, 25, 315/27 R; 340/324 A, 324 AD

[56] References Cited

UNITED STATES PATENTS

| | | | |
|---|---|---|---|
| 3,323,119 | 5/1967 | Barcomb et al. | 340/324 A |
| 2,709,770 | 5/1955 | Hansen | 315/24 |
| 3,422,420 | 1/1969 | Clark | 340/324 A |
| 3,117,307 | 1/1964 | Davie | 340/337 UX |
| 3,161,866 | 12/1964 | Orenstein et al. | 340/324 A |
| 3,210,599 | 10/1965 | Ward | 315/27 R |
| 2,987,715 | 6/1961 | Jones et al. | 340/324 AD |
| 3,298,013 | 1/1967 | Koster | 340/325 AD |

*Primary Examiner*—David L. Trafton
*Attorney*—Townsend and Townsend

[57] ABSTRACT

A computer output display system in which alphanumeric characters are sequentially displayed on the face of a cathode ray tube at discrete locations thereon, so as to produce a printed page-type composition which may be photographed to produce a permanent record of the computer output data. Such a computer output display system comprises a cathode ray tube having two deflection systems, the first, or major deflection system, for deflecting the beam to a particular area of the face of the cathode ray tube, and the second, or minor deflection system, for scanning that particular area in a stepwise manner, the beam of the cathode ray tube being synchronously intensity modulated to produce the image of the desired alphanumeric character. In addition, a multicharacter buffer capable of temporarily storing a sufficient number of characters to allow time for the cathode ray tube beam to be translated across the face of the cathode ray tube, from one end to the other, as would occur at the end of a line, may be provided to permit operation with computer output data that is not line-formated.

8 Claims, 4 Drawing Figures

INVENTORS
RICHARD A. HWANG
ROLF D. KAHLE
ARTHUR H. ROSHON
PAUL N. SEITZ

Townsend and Townsend
ATTORNEYS

INVENTORS
RICHARD A. HWANG
ROLF D. KAHLE
ARTHUR H. ROSHON
PAUL N. SEITZ

Townsend and Townsend
ATTORNEYS

INVENTORS
RICHARD A. HWANG
ROLF D. KAHLE
ARTHUR H. ROSHON
PAUL N. SEITZ

Townsend and Townsend
ATTORNEYS

COMPUTER OUTPUT DISPLAY SYSTEM

This invention relates to a computer output display system.

Digital computers generally produce coded electrical output signals which must be appropriately processed to produce a conventional alphanumeric presentation of the computer output. Typically, this is accomplished by an electromechanical printer, which produces a printed page containing alphanumeric characters in response to the computer output signals. The principle drawback of such computer output systems is the relatively slow speed of the electromechanical printing device, which is far slower than the rate at which a modern digital computer produces output data. Accordingly, electromechanical printers are generally operated "off line," the computer output data being recorded on magnetic tape for subsequent processing by the electromechanical printing system. Nonetheless, the slow speed of the electromechanical printer has made the display of computer output a burdensome and time consuming procedure.

Faster computer output display systems have been developed which employ cathode ray tubes. One such system employs a cathode ray tube as a controlled light source for selectively illuminating characters on a transparency array placed in front of the cathode ray tube. The characters thus illuminated are photographically recorded to produce a permanent record of the computer output data. However, since characters are displayed at arbitrary locations, such a computer output system requires the use of additional, and often complex, electronics or optics to produce a page-type format relationship between the characters thus produced.

Another cathode ray tube-type computer output display system employs a cathode ray tube having a character array internal thereto, commonly referred to as a Charactron. The electron beam is selectively directed through the array so that the beam is formed in the shape of the selected character. The beam is thereafter deflected to achieve the necessary spacial relationship between characters. However, such a cathode ray tube is unduly complex, thus making such a computer output display system unduly complex, expensive and unreliable.

According to the present invention, a computer output display system is provided in which alphanumeric characters are sequentially displayed on the face of a cathode ray tube at discrete locations thereon, so as to produce a printed page-type composition which may be photographed to produce a permanent record of the computer output data. This is accomplished by providing a cathode ray tube with two deflection systems, the first, or major deflection system, for deflecting the beam to a particular area of the face of the cathode ray tube, and the second, or minor deflection system, for scanning that particular area in a stepwise manner, the beam of the cathode ray tube being synchronously intensity modulated to produce the image of the desired alphanumeric character. The stepwise scanning may be regarded as positioning the beam in a matrix-type manner. In a preferred embodiment of the present invention each character is represented by a seven by ten matrix. The computer output signals are employed to address a read only memory in which the desired intensity at the various positions of the matrix for each alphanumeric character are stored in binary form. The output of the read only memory is employed to blank and unblank, and thus modulate, the beam of the cathode ray tube in synchronism with the positioning of the cathode ray tube beam by the second, or minor deflection system.

In addition, the computer output display system according to the present invention may comprise a multi-character buffer capable of temporarily storing a sufficient number of characters to allow time for the cathode ray tube beam to be translated across the face of the cathode ray tube from one end to the other, as would occur at the end of a line of alphanumeric characters. Thereafter, characters are displayed at a somewhat faster rate than they are received, so that the multi-character buffer will be emptied by the end of the subsequent line. In this manner, the computer output system according to the present invention may be employed with computer output data that is not line-formated, or, more particularly, computer output data which does not include time delays at the end of each line.

Accordingly, it is an object of the present invention to provide a computer output display system in which alphanumeric characters are displayed at discrete locations on the face of a cathode ray tube in simulation of a printed page-type format.

Another object of the present invention is to provide a computer output display system in which a first deflection system is employed to position the beam at a particular area of the face of the cathode ray tube and a second deflection system is employed to scan that particular area, the beam of the cathode ray tube being intensity modulated to produce a display of alphanumeric characters in a printed page-type format.

A further object of the present invention is to provide a computer output display system capable of displaying non-line formated computer output data.

These and other objects, features and advantages of the present invention will be more readily apparent from the following detailed description with reference to the accompanying drawings, wherein.

Figure 1:
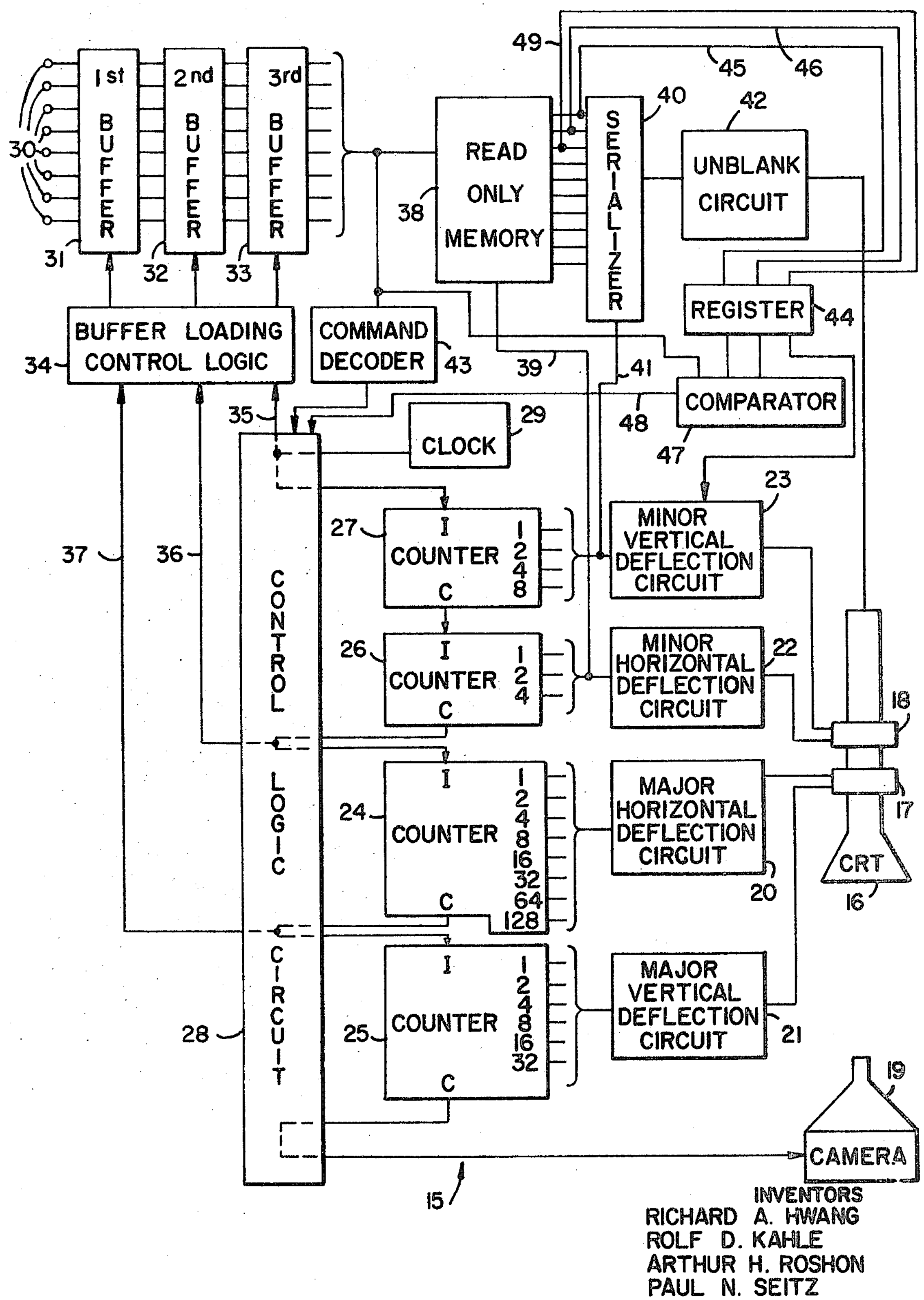
FIG. 1 is a block diagram of a computer output display system according to the present invention.

Referring initially to FIG. 1, there is depicted a computer output display system 15 according to the present invention having a cathode ray tube 16, hereinafter referred to as CRT 16. A pair of deflection coils 17 and 18 are disposed around the neck of CRT 16, and function to deflect the beam thereof. More particularly, deflection coil 17 functions to deflect the beam to a particular area on the face of CRT 16, while deflection coil 18 functions to scan that area in a stepwise manner, as will be described in greater detail hereinafter. A camera 19 may be disposed in front of CRT 16 to photographically record the alphanumeric display thereon.

Deflection coil 17 is excited by a major horizontal deflection circuit 20 and a major vertical deflection circuit 21. Similarly, deflection coil 18 is excited by a minor horizontal deflection circuit 22 and a minor vertical deflection circuit 23. Deflection circuits 20, 21, 22 and 23 may preferably comprise switching ladder circuits adapted to apply currents to deflection coils 17 and 18, respectively, in response to binary coded signals applied thereto, the beam of CRT 16 being thus translated in response to the binary coded signals applied to deflection circuits 20, 21, 22 and 23. The nature of deflection circuits 20, 21, 22 and 23 will be more readily apparent from a detailed description of minor vertical deflection circuit 23 which will be provided hereinafter.

The binary signals applied to deflection circuits 20, 21, 22 and 23 are the output signals of four binary counters 24, 25, 26 and 27, respectively. The output of binary counter 25 represents the number or vertical position of the particular horizzontal line upon which the character being displayed is to appear, and thus controls major vertical deflection circuit 21. Similarly, the output of binary counter 24 represents the horizontal character position of the particular character being displayed, and thus controls major horizontal deflection circuit 20. Binary counters 24 and 25 thus have capacities equal to the number of characters in a line, and the number of lines in a page, respectively. Furthermore, binary counters 24 and 25 are adapted to produce carry output signals at the carry outputs C thereof at the end of a line or page, respectively.

In a preferred embodiment of the present invention, the printed page-type format to be displayed comprises 64 lines, each line having 132 characters. Thus, binary counter 25 has a capacity of 64, and is adapted to produce a carry output C upon the completion of the 64th line of the page. Similarly, binary counter 24 has a capacity of 132, and is adapted to produce a carry output C upon the completion of the 132nd character of a line.

As briefly referred to hereinbefore, each character is displayed by scanning the beam of CRT 16 in a stepwise manner at the general region defined by major horizontal and vertical deflection circuits 20 and 21. This may be regarded as scanning a matrix of rows and columns, such scanning being accomplished by minor horizontal and vertical deflection circuits 22 and 23 under control of binary counters 26 and 27, respectively. Thus, each character may be regarded as being formed by a matrix comprising horizontal rows and vertical columns. In particular, the output of binary counter 26 represents the number or horizontal position of a particular vertical column of the character matrix, and thus controls minor horizontal deflection circuit 22. Similarly, the output of binary counter 27 represents the number or vertical position of a particular horizontal row of the character matrix, and thus controls the minor vertical deflection circuit 23. In a preferred embodiment of the present invention each character is displayed by a 7 vertical column by 10 horizontal row matrix. Accordingly, binary counter 26 has a capacity of seven and binary counter 27 has a capacity of ten, binary counters 26 and 27 being adapted to produce carry outputs C when their capacity is exceeded.

The inputs I of binary counters 24, 25, 26 and 27 are connected to a control logic circuit 28. A clock signal produced by a clock circuit 29, such as an astable multivibrator, is applied to control logic circuit 28 which functions to sequentially advance binary counters 24, 25, 26 and 27 in such a manner that the beam of CRT 16 will scan successive columns of the character matrix, the beam being positioned to successive character positions after completion of the character matrix scan. In particular, control logic circuit 28 functions to apply the clock signal produced by clock 29 to the input I of binary counter 27, as indicated in dashed line in FIG. 1. This results in the periodic increase in the binary output of binary counter 27, and thus the periodic vertical translation of the beam of CRT 16 along a column of the character matrix, in response to minor vertical deflection circuit 23. When the scanning of a column is completed, a signal will appear at the carry output C of binary counter 27. This signal is applied to the input I of binary counter 26, causing the output of binary counter 26 to increase by one. This, in turn, causes the beam of CRT 16 to translate horizontally to a subsequent column, under control of minor horizontal deflection circuit 22. In this manner, it is apparent that the scanning of each character is accomplished in a column-by-column manner, each column being scanned in a stepwise manner.

When the scanning of a character is completed, a signal will appear at the carry output C of binary counter 26. This signal is applied, via control circuit 28, to the input I of binary counter 24, as indicated in dashed line in FIG. 1. This causes the output of binary counter 24 to increase by one, which, in turn, causes the beam of CRT 16 to be horizontally translated to a subsequent character position under control of major horizontal deflection circuit 20. At this and subsequent character positions, the character matrix is scanned in the manner previously described.

Upon completion of the scanning of the last character in a line, a signal will appear at the carry output C of binary counter 24, which is applied, via control logic circuit 28, to the input I of binary counter 25, as indicated in dashed line in FIG. 1. This causes the output of binary counter 25 to increase by one, which, in turn, causes the beam of CRT 16 to be vertically translated to a subsequent line under control of major vertical deflection circuit 21. It is thus apparent that the beam of CRT 16 is caused to scan each line, character-by-character, the entire page being scanned line-by-line.

Upon completion of the last line of the page-type format, a signal will appear at the carry output C of binary counter 25. This signal may be applied, via control logic circuit 28, to camera 19, as indicated in dashed line in FIG. 1, to cause the film to be advanced in camera 19, the photographic image of the alphanumeric page-type display on the face of CRT 16 having been recorded therein.

Synchronous with the scanning of CRT 16 thus described, the intensity of the beam of CRT 16 is modulated to produce the display of alphanumeric characters referred to hereinbefore. In particular, coded electrical input signals are applied to a plurality of input terminals 30. In a preferred embodiment of the present invention, the input signals applied to input terminals 30 are coded in accordance with the Extended Binary Coded Decimal Interchange Code, hereinafter referred to as EBCDIC, wherein alphanumeric characters are represented by 8 binary signals. Accordingly, the computer output display system 15 according to the present invention is depicted in FIG. 1, and will be described hereinafter, in accordance therewith, wherein eight input terminals 30 are provided. It will be apparent however that the computer output display system according to the present invention may be readily adapted for use with other input signal coding systems.

Input terminals 30 are connected to the inputs of a first buffer 31. The outputs of first buffer 31 are connected to the inputs of a second buffer 32, the outputs of which are connected, in turn, to the inputs of a third buffer 33. Buffers 31, 32 and 33 comprise eight bit parallel registers, and cooperate to provide a storage capability of three EBCDIC characters. Buffers 31, 32 and 33 are employed to store the characters received during the time interval required to translate the beam of CRT 16 from the end of a line to the start of a subsequent line. This retrace time interval may be considerable with respect to the rate at which input signals are received, and is determined by the settling time required for large excursions of the beam of CRT 16. In the preferred embodiment of the computer display system according to the present invention depicted in FIG. 1, input signals are received approximately every 50 microseconds, and a time interval in excess of 100 microseconds is required to translate the beam of CRT 16 from the end of one line to the start of another. Thus, buffers 31, 32 and 33 are provided to store the three characters received during this retrace time interval, when the characters received are not capable of display. Accordingly, the computer output display system according to the present invention may accept input signals which are not line-formated, namely, input signals not having delays at the end of each line. If, however, line-formated input signals are employed, it is apparent that buffers 31, 32 and 33 may be deleted.

The loading of buffers 31, 32 and 33 is controlled by a buffer loading control logic circuit 34, which receives the clock signals, and the carry output signals of binary counters 26 and 24, via leads 35, 36 and 37, respectively. Buffer loading control logic circuit 34 functions to transfer the characters from buffer to buffer upon completion of the display of a character, the buffers functioning to store the characters received during the retrace period. While the construction and operation of buffer loading control logic circuits 34 will be described in greater detail hereinafter, it is apparent that the characters to be displayed will appear at the output of third buffer 33.

In order to accomplish the storing of the characters received during the retrace period, it is necessary that buffers 31, 32 and 33 be emptied at the end of each line. This is accomplished by displaying characters at a somewhat greater rate than they are received. Accordingly, the rate of clock 29 is such that binary counters 26 and 27 will complete their cycles, and thus a character will be displayed, in a time interval somewhat less than the time interval between the receipt of successive characters. In the preferred embodimenet of the present invention, the rate of clock circuit 29 is 2 megacycles per second, so that 35 microseconds are required to cycle binary counters 26 and 27, and thus display a character. Since additional time is required for the transfer of characters between buffers 31, 32 and 33, the overall time required to display a character is approximately 44 microseconds, which is less than the fifty microsecond interval between receipt of characters. Accordingly, buffers 31, 32 and 33 will be emptied by the end of each line, the characters being displayed at a greater rate than the rate at which they are received. In this manner, buffers 31, 32 and 33 will be available for the storage of the characters received during the retrace period following the end of each line.

The outputs of third buffer 33 are connected to the addressing inputs of a read only memory 38. In addition, the outputs of binary counter 26 is applied, via leads 39, to the addressing inputs of read only memory 38. Read only memory 38 contains the desired intensities at the various positions of the character matrix for each alphanumeric character, stored in binary form therein. Since the output signals of binary counter 26 represent the horizontal position of a character matrix, and the outputs of third buffer 33 represent the particular alphanumeric character, read only memory 38 is addressed for each vertical column of the character matrix of the particular alphanumeric character. Thus, the output signals of read only memory 38 represent the desired intensity of the beam of CRT 16 at the various positions in the vertical column of the character matrix. Accordingly, in the preferred embodiment of the present invention, wherein each character comprises a 7 × 10 character matrix, 10 output signals will appear at the outputs of read only memory 38, each output signal corresponding to a particular vertical location in the column of the character. Furthermore, it is apparent that as the output of binary counter 26 increases, the output signals of read only memory 38 will correspond to subsequent columns of the churacter matrix. Read only memory 38 may typically comprise a braided transformer read only memory.

In the preferred embodiment of the present invention, read only memory 38 contains, in addition to the desired intensity signals referred to hereinbefore, certain verification and control signals for each character. These verification and control signals are produced at the outputs of read only memory 38 when the output signal of binary counter 26, which addresses read only memory 38 via leads 39, is zero. In the preferred embodiment of the present invention, the output of binary counter 26 will be zero prior to the scanning of the first column of the character matrix. Thus, the verification and control signals will appear at the output of read only memory 38 prior to the scanning of the character matrix. The nature and function of these vertification and control signals will be described hereinafter.

The outputs of read only memory 38 are connected to a serializer 40. Serializer 40 functions to select the particular output signal of read only memory 38 corresponding to the location of the beam of CRT 16, in response to the output signals of binary counter 27 applied to serializer 40 via leads 41. The output signal of serializer 40 is connected to an unblanking circuit 42, the output of which controls the intensity of the beam of CRT 16 in a conventional manner. Thus, the beam of CRT 16 will either be blanked or unblanked, depending upon the output of serializer 40. Since the output of serializer 40 is determined by the outputs of binary counter 27, the inputs of whih are produced by read only memory 38 in response to the outputs of binary counter 26, it is thus apparent that the blanking or unblanking, and thus modulation, of the beam of CRT 16 is accomplished in synchronism with the scanning thereof. Thus, as each character matrix is scanned, the beam of CRT 16 is synchronously blanked or unblanked to produce a visual representation of the particular alphanumeric character at the outputs of third buffer 33. Furthermore, the interconnection of binary counters 24, 25, 26 and 27 with control logic circuit 28 functions to translate the beam of CRT 16 to a subsequent character position on a line upon completion of the display of a previous character, thus producing the printed page-type composition or format referred to hereinbefore.

In addition, the computer output display system 15 according to the present invention may comprise a command decoder circuit 43, to which the output signals of third buffer 33 are applied. Command decoder 43 comprises logical circuitry for the recognition of particular EBCDIC coded signals which represent commands for the computer output display system. Typically, such signals represent commands to advance one or more spaces or lines, or to terminate the present page and start another. The output signals of command decoder 43 are applied to control logic circuIt 28, which contains convention logic circuitry for the advancement of binary counter 24 and 25 in response thereto, so as to accomplish the result indicated by the particular command. Thus, additional spacing may be introduced between characters and/or lines in response to conventional command input signals.

The nature and operation of the verification and control signals produced by read only memory 38 will now be described. In the EBCDIC coding system, there are 256 possible input signals. These may be regarded as comprising four quadrants of 64 input signals, the particular quadrant being determined by two of the eight EBCDIC input signals. Furthermore, all of the characters to be displayed are contained in two of the four quadrants. According to the present invention, two verification signals are stored in read only memory 38. These verification signals correspond to the complements of the two quadrant-determining signals for the particular EBCDIC character. Read only memory 38 may then be addressed by the six character-determining signals of the eight EBCDIC input signals. Thereafter, the remaining two EBCDIC input signals or, more particularly, the quadrant-determining input signals may be compared with the two verification signals produced by read only memeory 38 to determine if a valid character has been received. This is accomplished by applying the two verification signals from read only memory 38 to a register 44, via a pair of leads 45 and 46. The outputs of register 44 are connected to a comparator circuit 47. In addition, the outputs of third buffer 33 are connected to comparator circuit 47. Comparator circuit 47 functions to compare the verification signals and the two quadrant-determining EBCDIC input signals. If the verification signals do not correspond to the complements of the quadrant-determining EBCDIC input signals, comparator circuit 47 will produce an output signal, which is applied, via a lead 48, to control logic circuit 28. Control logic circuit 28 may comprise suitable circuitry for accomplishing a desired function in response thereto. In particular, control logic circuit 28 may be adapted to cause the computer output display system 15 to print a rectangle in place of the character determined to be invalid. In this manner, the accuracy of the displayed characters is obviously enhanced.

The control signal produced by read only memroy 38 is also applied to register 44, via a lead 49. This control signal will be produced by read only memory 38 upon receipt of EBCDIC input signals corresponding to characters which require display in an area below the normal character matrix, for example, the lower case characters *g*, *j*, *p*, *q* and *y*. The output of register 44 corresponding to the control signal on lead 49 is applied to minor vertical deflection circuit 23, which functions to vertically shift the character forming matrix downward, in response thereto. Thus, the control signal produced by read only memory 38 functions to vertically displace the character forming matrix for those characters requiring display below the line of characters.

In operation, the outputs of binary counters 24, 25, 26 and 27 are initially zero, causing the beam of CRT 16 to be positioned in the upper left hand corner of the screen. EBCDIC input signals are applied to input terminals 30, and are propagated to the outputs of third buffer 33 under control of buffer loading control logic circuit 34, in a manner to be described in greater detail hereinafter. Since the output of binary counter 26 is zero, the verification and control signals referred to hereinbefore will appear at the outputs of read only memory 38. If the verification referred to hereinbefore is successfully accomplished by comparator circuit 47, binary signals indicative of the desired intensities of the various positions in the first vertical column of the character matrix for the particular alphanumeric character will thereafter appear at the output of read only memory 38. Serializer 40 selects the particular signal associated with the first or uppermost portion in that row, and applies it to unblanking circuit 42, which blanks or unblanks the beam of CRT 16 in response thereto.

Of course, the pulses produced by clock circuit 29 are now counted by binary counter 27 which, in turn, causes the beam of CRT 16 to be periodically deflected downward, the particular signal from read only memory 38 selected by serializer 40 changing synchronously therewith. Upon completion of the scanning of the first column an output signal will appear at the carry output C of binary counter 27, which signal is counted by binary counter 26. This results in the translation of the beam of CRT 16 to the first or uppermost position of the second column of the character matrix, and the re-addressing of read only memory 38, whereby the signals corresponding to the intensities of the second matrix column will be produced. The second and subsequent columns of the character Matrix are then scanned in a similar fashion.

Upon completion of a character, an output signal will appear at the carry output C of binary counter 26, which signal causes binary counter 24 to advance. This, in turn, causes the beam of CRT 16 to be translated to the right, to the starting position of a new character. Upon receipt of subsequent EBCDIC input signals at input terminals 30, subsequent characters will be scanned in a similar fashion.

At the completion of a line, an output signal will appear at the carry output C of binary counter 24. This signal will cause binary counter 25 to advance, which, in turn, will cause the beam to be vertically translated downward, and thus to a start of a new line. Simultaneously, of course, the beam of CRT 16 is translated to the left by the resetting of binary counter 24. As referred to hereinbefore, this requires a significant time interval, referred to as the retrace time, during which time characters may not be displayed. Accordingly, during this retrace period, EBCDIC input signals received at input terminals 30 will be stored in buffers 31, 32 and 33, under control of buffer loading control logic circuit 34, in a manner to be described in greater detail hereinafter. Furthermore, since the characters thus stored will be displayed at a somewhat greater rate than they were produced, it is apparent that buffers 31, 32 and 33 will be emptied by the end of the subsequent line, thus permitting similar operation at the end of subsequent lines.

Accordingly, it is apparent that characters will be sequentially displayed on the face of CRT 16 in a page-type format. At the completion of a page, an output signal will appear at the carry output C of binary counter 25. This signal may be applied to camera 19, so as to cause the film to be advanced therein, the page thus displayed having been photographically recorded.

Figure 2:
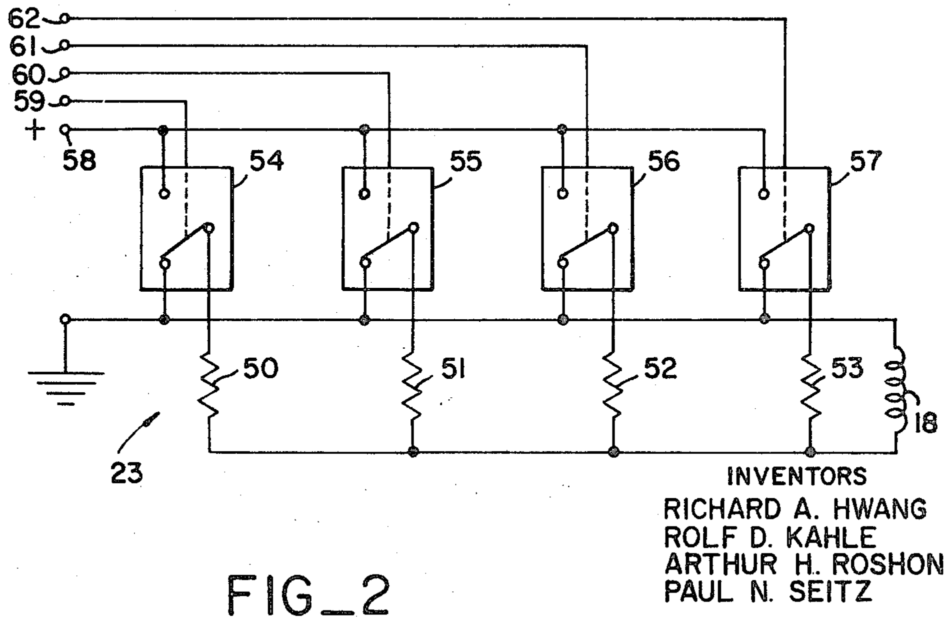
FIG. 2 is a schematic diagram of the minor vertical deflection circuit of the apparatus depicted in FIG. 1.

Referring now to FIG. 2, the construction and operation of minior vertical deflection circuit 23 will now be described in detail. Of course, the circuitry thus described may be readily adapted to function as any of the other deflection circuits 20, 21 or 22, minor vertical deflection circuit 23 being described herein for illustrative purposes.

One end of the vertical portion of minor deflecton coil 18 is connected, in common, to four resistors 50, 51 52 and 53 while the other end of the vertical portion of minor deflection coil 18 is gounded. The other ends ef resistors 50, 51, 52 and 53 are respectively connected to the arms of four SPDT switches 54, 55, 56 and 57. Switches 54, 55, 56 and 57 are operative to connect resistors 50, 51, 52 and 53, respectively, to either ground or voltage applied to a power terminal 58. Minor vertical deflections circuit 23 further comprises four input terminals 59, 60, 61 and 62, which are respectively connected to the actuating inputs of switches 54, 55, 56 and 57. Thus, the position of switchs 54, 55, 56 and 57 will be determined by the presence or absence of input signals at input terminals 59, 60, 61 and 62, respectively. While switches 54, 55 56 and 57 are depicted, and have been described, as if they were mechanical, it is to be understood that this has been done for illustrative purposes only, and that the switches may, in fact, comprise a plurality of switching transistors.

Resistors 50, 51, 52 and 53 are selected to produce a linear relutionship between the current through deflection coil 18 and the binary input signals applied to input terminals 59, 60, 61 and 62. In particular, resistor 53 has half the resistance of resistor 52 which, in turn, has half the resistance of resistor 51, resistor 51 having half the resistance of resistor 50. This creates a binary weighted resistance ladder, resistors 50, 51, 52 and 53 corresponding to the "1's", "2's", "4's" and "8's" places, respectively.

Accordingly, in operation, input terminals 59, 60, 61 and 62 are connected to the "1's", "2's", "4's" and "8's" outputs of binary counter 27. The binary output of binary counter 27 will thus cause certain of the switches 54, 55, 56 Fnd 57 to be actuated, which, in turn, will cause a current, linearly related to the binary number at the output of binary counter 27, to flow through minor deflection coil 18. This, in turn, will cause the desired deflection of the beam of CRT 16 described hereinbefore. Of course, minor vertical deflection circuit 23 may include another resistor and electronic switch adapted to produce the desired downward translation of the character matrix in response to the control signals produced by read only memory 38.

Figure 3:
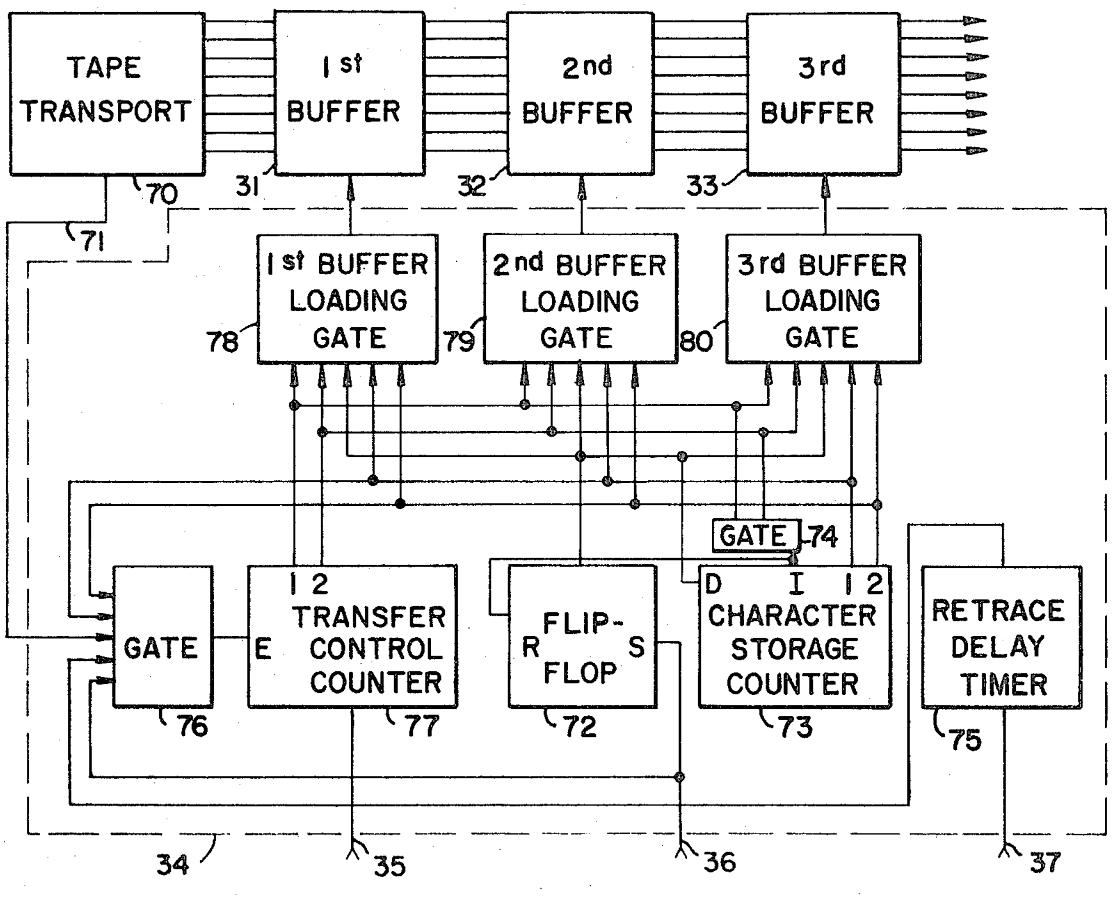
FIG. 3 is a more detailed block diagram of the input buffer portion of the apparatus depicted in FIG. 1.

Referring now to FIG. 3, the construction and operation of buffer loading control logic 34 will now be explained in detail. Depicted in FIG. 3 is a tape transport 70 which produces the EBCDIC input signals for the computer output system according to the present invention, as described hereinbefore. Of course, the computer output system according to the present invention may be readily adapted for operation "on line," rather than with input signals produced by a tape transport, tape transport 70 being depicted herein for illustrative purposes only. In addition to the EBCDIC signals, tape transport 70 is also adapted to produce a strobe signal on a lead 71 indicative of the production of an EBCDIC signal. Such a signal is typically produced by a tape transport strobe in a conventional manner. The strobe signal thus produced is applied via lead 71 to buffer loading control logic 34.

As briefly referred to hereinbefore, buffers 31, 32 and 33 are provided to store input signals received while the beam of CRT 16 is being retraced from the end of a line to the start of a subsequent line. In the preferred embodiment of the present invention, this retrace requires in excess of 100 microseconds, and input signals are received approximately everY 50 microseconds. Accordingly, three buffers 31, 32 and 33 are provided to store three characters during the retrace time interval.

As briefly described hereinbefore, it is desired that the character to be displayed be stored in third buffer 33. This is accomplished by controlling the loading of buffers 31, 32, and 33, in two different manners. In particular, when a character is displayed, it is necessary to transfer the character stored in second buffer 32 to third buffer 33 for subsequent display. Furthermore, the character stored in first buffer 31 must be transferred to second buffer 32 in order to empty first buffer 31, thus permitting the receipt of subsequent characters. This transfer cycle, hereinafter referred to as the display cycle, is initiated by receipt of a signal on lead 36, indicative of the completion of the display of a character. The second manner in which signals are transferred amongst buffers 31, 32 and 33 is referred to as the input cycle, in which it is desired to transmit an input signal from tape transport 70 to the last empty buffer 31, 32 or 33.

The operating cycle of operating control logic circuit 34 is determined by the state of a flip-flop 72. In particular, the setting input S of flip-flop 72 is connected to lead 36, so that flip-flop 72 will be set upon the arrival of a signal on lead 36 indicative of the completion of the display of a character. Thus, the set state of flip-flop 72 corresponds to the display cycle referred to hereinbefore, and the reset state of flip-flop 72 corresponds to the input cycle referred to hereinbefore.

Since the manner in which characters are transferred depdnds, in part, upon the number of characters stored in buffers 31, 32 and 33, there is provided a character storage counter 73, the binary outputs of which represent the number of characters in storage. Since this number may increase or decrease, character storage counter 73 is bi-directional, and includes a counting input I and a direction input D. The direction input D of character storage counter 73 is connected to the output of flip-flop 72, so that character storage counter 73 will be conditioned to count down when flip-flop 72 is in its set state and to count up when flip-flop 72 is in its reset state. The counting input I of character storage counter 73 is connected to the output of a gate 74. The inputs of gates 74 are suitably connected, in a manner to be described hereinafter, to apply a counting pulse to character storage counter 73 upon the completion of either of the cycles. Accordingly, a count will be subtracted from the total in character storage counter 73 upon completion of a display cycle and a count will be added to the total in character storage counter 73 upon completion of an input cycle.

Buffer loading control logic circuit 34 further includes a retrace delay timer 75, the input of which is connected, via lead 37, to the carry output C of binary counter 24, so that retrace delaY timer 75 will commence its timing interval upon completion of the display of the last character in a line. The timing interval of retrace delay timer 75 corresponds to the time interval required to retrace the beam of CRT 16, as described hereinbefore. Accordingly, a signal will appear at the output of retrace delay timer 75 during that time interval.

The output of retrace delay timer 75 is connected to an input of a gate 76. The output of gate 76 is connected to the enable input E of a transfer control counter 77. The clock signal produced by clock 29 is applied, via lead 35, to the counting input of transfer control counter 77. Transfer control counter 77 functions to count to three at the clock rate when the enable input E thereof is activated by gate 76.

Gate 76 functions to enable transfer control counter 77 under two conditions. First, an input of gate 76 is connected to lead 36, and gate 76 functions to enable transfer control counter 77 when a signal is received on lead 36, and no output signal appears from retrace delay counter 75. Thus the first condition upon which transfer control counter is enabled exists when a character which is not at the end of a line has been completed, thus commencing a display cycle.

Other inputs of gate 76 are connected to lead 71 and the outputs of character storage counter 73. The second condition upon which transfer control counter 77 is enabled exists when a signal is present on lead 71, and signals do not appear on both of the output leads of character storage counter 73, there being less than three characters in storage. This condition corresponds to the commencement of an input cycle, when an input signal is to be received and less than three characters are in storage. As is apparent from the foregoing, the two conditions for the enabling of transfer control counter 77 correspond to the commencement of the display and input cycles referred to hereinbefore, respectively.

The outputs of transfer control counter 77 are connected to the inputs of gate 74, gate 74 being adapted to apply a pulse to the counting input I of character storage counter 73 and the reset input R of flip-flop 72 after the count of three, so that the count of three marks the end of either of the cycles.

The outputs of transfer control counter 77, character storage counter 73 and flip-flop 72 are connected to the inputs of a first buffer loading gate 78, a second buffer loading gate 79 and a third buffer loading gate 80. Buffer loading gates 78, 79 and 80 are adapted to control the loading of buffers 31, 32 and 33, respectively. In particular, first buffer loading gate 78 is adapted to load first buffer 31 upon the first transfer control counter 77 count of an input cycle, if the number of characters in storage is less than three.

Second buffer loading gate 79 is adapted to load second buffer 32 under two conditions. First, second buffer 32 will be loaded on the second count of transfer control counter 77 during an input cycle thereof, if less than two characters are n storage. Secondly, second buffer loading gate 79 will cause second buffer 32 to be loaded on the second count of transfer control counter 77 during a display cycle, if three characters are in storage.

Third buffer loading gate 80 causes third buffer 33 to load under two conditions. First, if there are no characters in storage during an input cycle, third buffer 33 will be loaded on the third count of transfer control counter 77. Secondly, if any characters are in storage during a display cycle, third buffer 33 will be loaded on the first count of transfer control counter 77.

Figure 4:
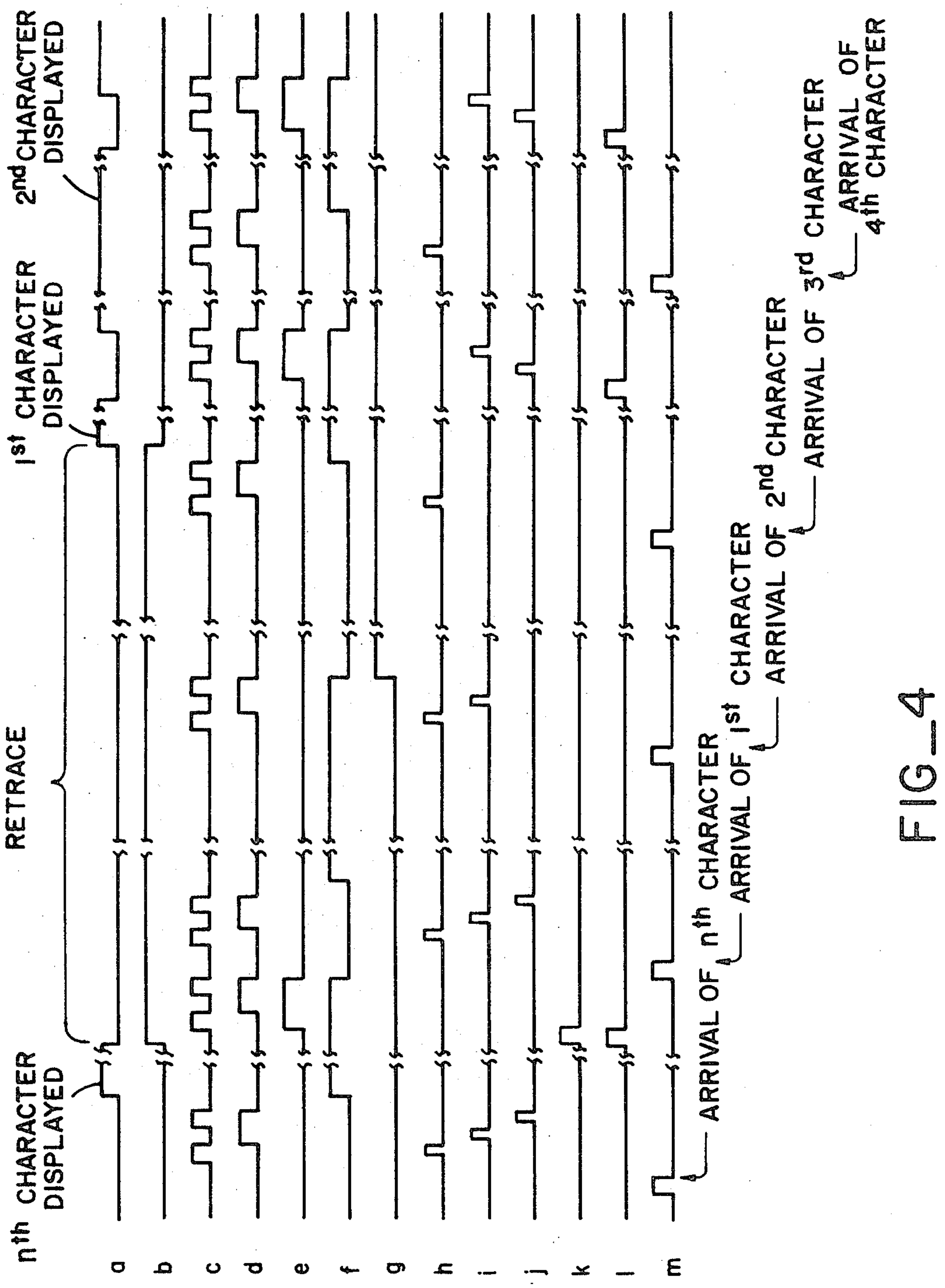
FIG. 4 is a graph depicting the operation of the apparatus shown in FIG. 3 with respect to time.

Referring now to FIG. 4, the operation of buffer loading control logic circuit 34 will now be described. The signals depicted in FIG. 4 may be identified by reference to Table 1, and, in the following description, the letter associated with the particular signal being described will be indicated parenthetically.

TABLE I

Signal *a* = a graphic representation of whether a character is being displayed
Signal *b* = output of retrace delay timer 75
Signal *c* = "1" output of transfer control counter 77
Signal *d* = "2" output of transfer control counter 77
Signal *e* = output of flip-flop 72
Signal *f* = "1" output of character storage counter 73
Signal *g* = "2" output of character storage counter 73
Signal *h* = output of first buffer loading gate 78
Signal *i* = output of second buffer loading gate 79
Signal *j* = output of third buffer loading gate 80
Signal *k* = line completed signal on lead 37
Signal *l* = character completed signal on lead 36
Signal *m* = tape transport strobe signal 71

The operation of buffer loading control logic circuit 34 will be described commencing with the arrival of the strobe pulse (*m*) associated with the nth or last character of a line. This causes transfer control counter 77 to cycle (*c* and *d*) in the input mode, flip-flop 72 being in its reset state (*e*). The cycling of transfer control counter 77 causes buffer loading gates 78, 79 and 80 to transfer the character received from tape transport 70 through first buffer 31 and second buffer 32 to third buffer 33 (*h*, *i* and *j*), where it is available for display. Completion of the input cycle of transfer control counter 77 causes a count of 1 to be added to the output of character storage counter 73 (*f* and *g*), thus indicating that one character is in storage. The *n*th character is now displayed (*a*).

Upon completion of the displaY of the nth character, character and line completion signals (*l* and *k*) are received via leads 36 and 37. The line completed signal (*k*) causes retrace delay timer 75 to commence operation (b), while the character completed signal (*l*) causes flip-flop 72 to set (*e*) and transfer control counter 77 to thus commence its display cycle (*c* and *d*). However, since only the character is in storage, no transfer of characters amongst buffers 31, 32 and 33 occurs. At the completion of the display cycle, a count of one is subtracted from the total in character storage counter 73 (*f* and *g*) indicating that no characters are now in storage.

Arrival of the strobe pulse (*m*) associated with the first character of the subsequent line initiates an input cycle of transfer control counter 77 which, as previously described, causes the transfer of that character to buffer 33, and the addition of a count in character storage counter 73. Upon arrival of the strobe pulse ($m$) associated with the second character, transfer control counter 77 again commences its input cycle ($c$ and $d$). This will result In the transfer of the second character to second buffer 32, through first buffer 31 ($h$ and $i$), since one character is already in storage. Upon completion of the input cycle, a count of 1 will be added to the total in character sJorage counter 73 ($f$ and $g$), thus indicating that two characters are now in storage. Similarly, arrival of the strobe pulse ($m$) associated with the third character will cause another input cycle of transfer control counter 77. However, since two characters are already in storage, the third character will be loaded into first buffer 31 ($h$), and a count will be added to the total in character storage counter 73, thus indicating that three characters are now in storage.

When the retrace time interval has elapsed ($b$), the first character will be displayed ($a$). Upon completion of the display of the first character, an end of character signal ($l$) will be received, which will cause flip-flop 72 to be set ($e$), and transfer control counter 77 to cycle in the display mode ($c$ and $d$). This, in turn, will cause the second character, stored in second buffer 32, to be transferred to third buffer 33 ($j$), followed by the transfer of the third character, stored in first buffer 31, to second buffer 32 ($i$). Upon completion of the display cycle of transfer control counter 77, flip-flop 72 will be reset ($e$) and a count will be subtracted from the total in character storage counter 73 ($f$ and $g$), thus indicating that two characters are now in storage. The display of the second character, stored in third buffer 33, will now commence ($a$).

While the second character is being displayed, a strobe pulse ($m$) associated with the arrival of the fourth character will be received. This will cause transfer control counter 77 to commence an input cycle ($c$ and $d$), resulting in the loading of the fourth character into first buffer 31 ($h$). Upon completion of this input cycle, a count of 1 will be added to the total in character storage counter 73 ($f$ and $g$), thus indicating that three characters are now in storage.

Upon completion of the display of the second character, an end of character signal ($l$) will be received, which will cause flip-flop 72 to be set ($e$) and transfer control counter 77 to commence a display cycle ($c$ and $d$). As described with respect to the last display cycle, this will cause the third character stored in the second buffer 32 to be transferred to third buffer 33 ($j$), followed by the transfer of the fourth character stored in the first buffer 31 to second buffer 32 ($i$). Upon completion of this display cycle, flip-flop 72 will be reset ($e$) and a count of one will be subtracted from the total in character storage 73 ($f$ and $g$), thus indicating that two characters are now in storage.

Further operation of buffer loading control logic circuit 34 continues in a similar manner, it being understood that the characters are displayed at a somewhat greater rate than they are received, so that buffers 31, 32 and 33 will be emptied by the end of the line, as described hereinbefore.

Accordingly, buffer loading control logic circuit 34 functions to load buffers 31, 32 and 33 in such a manner that stored characters will be suitably advanced upon the completion of the display of a character, the received characters being transmitted to the highest or last available buffer for temporary storage. Of course, while buffer loading logic control circuit 34 has been described for use with three buffers, it may be readily modified and adopted for use with a greater or lesser number of buffers.

While a particular embodiment of the present invention has been described in detail, it is to be understood that adaptations or modifcations may be made without departing from the true spirit and scope of the invention, as set forth in the claims.

What is claimed is:

1. A deflection system for a cathode ray tube responsive to binary coded signals comprising a deflection coil disposed around said cathode ray tube, a plurality of resistors connected in common directly to one terminal of said deflection coil, the other terminal of said deflection coil being grounded, a plurality of electronic switches connected to the other ends of said resistors, each of said electronic switches corresponding to a different place of said binary signals and operative to either ground or apply a voltage to said other end of said resistor in response to said place of said binary signals, said resistors having binary-weighted resistances.

2. A computer output display system adapted to produce a page-type format display of alphanumeric characters in response to coded electrical input signals corresponding to alphanumeric characters comprising:

a cathode ray tube;

a high speed deflection coil disposed around Said cathode ray tube;

a high sensitivity deflection coil disposed around said cathode ray tube;

first, second, third and fourth binary counters, the outputs of said binary counters respectively corresponding to a vertical position in a character-forming matrix, a horizontal position in Said character-formIng matrix, a horizontal character position and a vertical line position;

first, second, third and fourth deflection means for producing deflection currents in response to the outputs of said first, second, third and fourth binary counters, respectively;

said first and second deflection means being connected to said high speed deflection coil and said third and fourth deflection means being connected to said high sensitivity deflection coil;

means periodically advancing said first and second binary counters to scan said character-forming matrix in a stepwise raster;

means advancing said third binary counter upon the completion of the scanning of said character-forming matrix:

means advancing said fourth binary counter upon completion of the scanning of a line of character-forming matrixes; and means for intensity modulating the beam of said cathode ray tube in response to said input signals and in synchronism with said binary counters.

3. Apparatus according to claim 2 wherein said means for intensity modulating the beam of said cathode ray tube comprises memory means containing binary coded signals corresponding to the desired intensities at the various locations in said character-forming matrices for the various alphanumeric characters, said memory means being addressed by said input signals and the output of said second binary counter to produce signals corresponding to the desired intensities of a vertical column of the character-forming matrix of the alphanumeric character corresponding to said input signal, serializer means connected to the output of said memory means and operative in response to the output of said first binary counter to select the particular intensity signal associated with the vertical position of the beam of said cathode ray tube in said character-forming matrix, and means for unblanking or blanking the beam of said cathode ray tube in response to the output of said serializer means.

4. Apparatus according tO claim 3 wherein said memory means further contains a control signal for certain of said characters, said memory means producing said control signal when the output of said Second binary counter is zero, and further comprising means for vertically translating the beam of said cathode ray tube downwardly in response to said control signals.

5. Apparatus according to claim 3 wherein said input signals are coded in accordance with the EBCDIC coding system.

6. Apparatus according to claim 5 wherein said EBCDIC input signals comprise six character-determing signals and two quadrant-determining signals and said memory means further contains vertification signals for each of said characters, said memOry means being addressed by the six character-determining signals of said input signals and the output of said second binary counter and being adapted to produce said verfication signals when the output of said second binary counter is zero, and further comprising comparator means for accomplishing a desired result when said verification signals do not correspond to said two quadrant-determining signals.

7. Apparatus according to claim 2 further comprising buffer means for storing input signals received during the time interval when the beam of said cathode ray tube is being horizontally translated from the end of a line of alphanumeric characters to the start of a subsequent line by said first deflection means.

8. Apparatus according to claim 7 wherein said buffer means comprises a plurality of buffers connected in series, each of said buffers having a capacity of one of said coded electrical input signals, said input signals being applied to the first of said buffers, means for transferring input signals to the last of said buffers that is empty and means for advancing the signals in said buffers by one buffer towards the last of said buffers upon the display of the alphanumeric characters associated with the input signal in the last of said buffers.

* * * * *